United States Patent [19]

Gorman

[11] Patent Number: 4,998,687

[45] Date of Patent: Mar. 12, 1991

[54] REMOVABLE LIFT SPOILER FOR PARKED AIRCRAFT

[76] Inventor: John M. Gorman, 5903 Fisher Ave., Ft. Hood, Tex. 76544

[21] Appl. No.: 402,543

[22] Filed: Sep. 5, 1989

[51] Int. Cl.$^5$ .............................................. B64C 3/58
[52] U.S. Cl. ................................ 244/100 R; 244/200; 244/213; 244/17.11
[58] Field of Search ............ 244/213, 200, 199, 1 R, 244/130, 17.11

[56] References Cited

U.S. PATENT DOCUMENTS

| | | | |
|---|---|---|---|
| 2,400,388 | 5/1946 | Campbell | 244/113 |
| 2,428,936 | 10/1947 | Hunter | 244/113 |
| 2,453,403 | 11/1948 | Bogardus | 244/200 |
| 3,044,516 | 7/1962 | Stoll | 244/1 R |
| 4,632,340 | 12/1986 | Duea | 244/200 |

Primary Examiner—Galen Barefoot

[57] ABSTRACT

A removable spoiler is described for reducing the rotorblade or wing lift of parked aircraft. It includes an airfoil cover with an inflatable aircell installed that is temporarily mountable to project into the airflow on the top of the rotorblade or wing. It extends for the greater portion of the lift generating surface of the rotorblade or wing to which applied.

3 Claims, 1 Drawing Sheet

REMOVABLE LIFT SPOILER FOR PARKED AIRCRAFT

FIELD OF THE INVENTION

The present invention relates to Helicopters and Fixed Wing Aircraft and more particularly to the protection of parked aircraft from high winds.

BACKGROUND OF THE INVENTION

Wind damage and even destruction of helicopters and other light aircraft parked on unprotected parking aprons, ramps, and other open sites is a common occurrence. In one recent documented case that occurred at Fort Hood, Tex. on 13 May 1989, a large thunderstorm which produced winds in excess of 60 miles per hour resulted in damage to U.S. Army aircraft estimated to be one-half billion dollars. It also resulted in an enormous burden to the taxpayer and significantly effected the readiness of the nations fighting forces. Although this and other damage from similar occurrences cannot be entirely eliminated, it can be significantly reduced. Current methods used to secure parked aircraft employ tie down devices or placing the aircraft in a protective hangar. The tie down devices have proved to be of limited protection in light to moderate wind conditions but have proven to be ineffective in extreme winds such as mentioned above. Hangars are the ultimate answer but are not always available due to space requirements and cost. The relative flexibility of helicopter rotorblades makes them particularly susceptible to damage. Much of the flexing of these blades is due to the lift they generate as a result of high winds blowing across their surfaces. Even though they are tied down, there is a tremendous tendency to flex up and down causing undue and excessive stress in the entire structure of the blade and the structure to which it is attached. The same stress is exhibited in smaller fixed wing aircraft. Should a tie down device come loose, the airfoil is free to fly. In the case of the helicopter it will flex up and damage the rotorblade itself and other rotor components. Small fixed wing aircraft will become ariborne and possibly be destroyed or damaged by turning over. The major objective of the present invention is to provide a portable, low cost, and effective system for reducing the damage to these aircraft by destroying the lift generating surfaces of the airfoil caused by high relative wind conditions such as that associated with storm gusts and sustained winds.

Previous designs which require many moving parts such as multiple hinges and pins rely on the wind to activate the spoiler system. This system would be subject to failure in the event the metal hinges and pins corrode, bend, or if the system is frozen in the down position caused by ice, snow, or freezing rain conditions. This would leave the aircraft unprotected and the system useless against those winds normally associated with the above mentioned conditions. Previous designs are of such material and size that would either not conform to larger airfoils that droop, as in any large multi-bladed helicopter or require multiple spoilers. One such previous invention described the preferred length to be two feet. This would create an installation problem insofar as the amount of time it would take to install the system, and the fact that the smaller system would require multiple spoilers to adequately perform the purpose it was intended to do. Example in point: The Boeing B-234/U.S. Army CH-47 medium lift helicopter has six main rotorblades which are approximately 28 feet in length. It would require approximately 12 of the above mentioned spoilers per rotorblade with a total of 72 devices to equip the entire aircraft to protect it adequately. This may also prove to be costly when outfitting an entire fleet or even one aircraft for a small owner/operator. Previous designs also appear to be designed with only the small fixed-wing aircraft in mind. The current invention will satisfy the needs of the larger aircraft and the smaller as well. The current invention consists of 3 parts, none moving, and is handled as one modular unit for easy installation and removal. It has application to any size or design airfoil.

SUMMARY OF THE INVENTION

In accordance with the present invention, a removable spoiler is provided. The spoiler is to be temporarily mounted on the rotorblade or wing of a parked aircraft to protect it from high wind damage. The invention consists of three basic components: cover, aircell chamber, and the aircell. It is handled, installed, and removed as a modular unit. It is stored as one unit per rotorblade or wing by folding or rolling. Simplicity of design also means no moving parts to wear out, corrode, or freeze in place. The invention is operational at all times when installed. Installation of the present invention is preferably sliding the cover over the end of the rotorblade or wing with the aircell on top, pulling it to the blade or wing root and securing it with the securing straps. Further security will be provided by its inherent design; when the aircell is inflated it will tend to take up any looseness as it expands. Once installed over the intended airfoil, a pneumatic hose will be connected to the airvalve on the aircell thence inflating the aircell to form its spoiler shape. In the preferred form of the invention the protection cover and the aircell chamber consists of a strong, light-weight fabric, reinforced by double and triple stitching where needed. The aircell may consist of a rubber-like material. The device would also include a fabric repair kit consisting of adequate sheet material, needle, and thread and an aircell kit consisting of adequate material to repair the aircell.

DESCRIPTION OF THE PREFERRED EMBODIMENT

Figure 1:
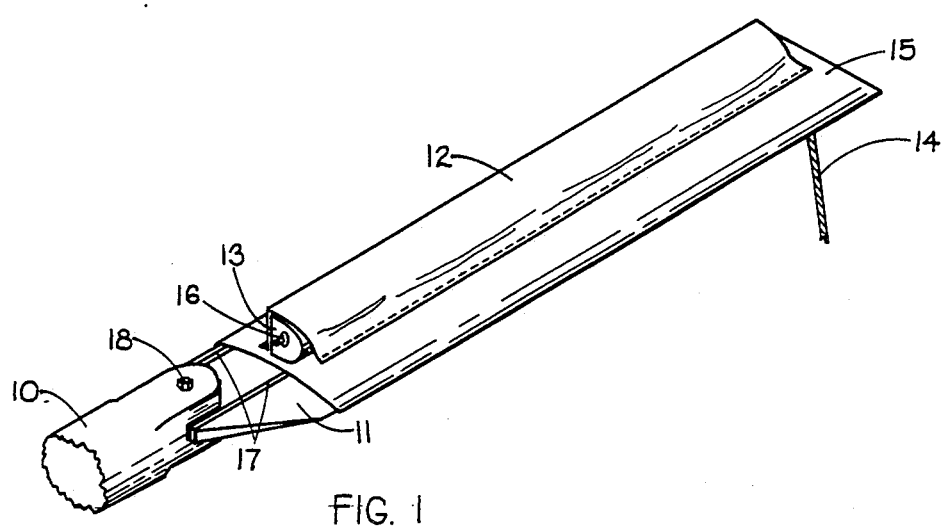
FIG. 1 is a view of inflated lift spoiler installed.
Figure 2:
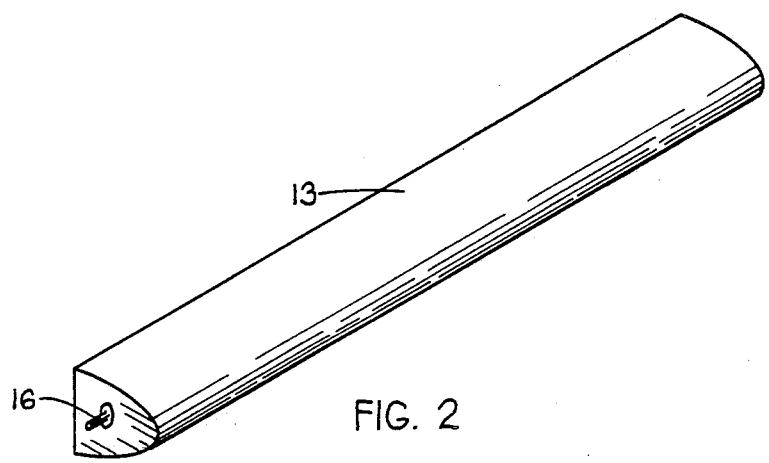
FIG. 2 is a perspective of an inflated aircell.
Figure 3:
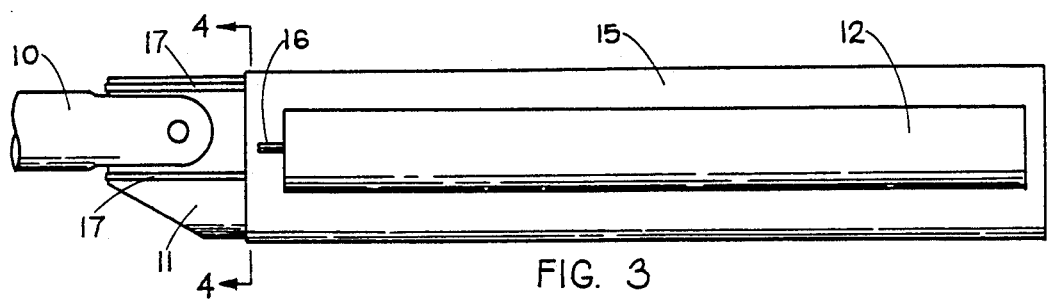
FIG. 3 is a top view similar to FIG. 1.
Figure 4:
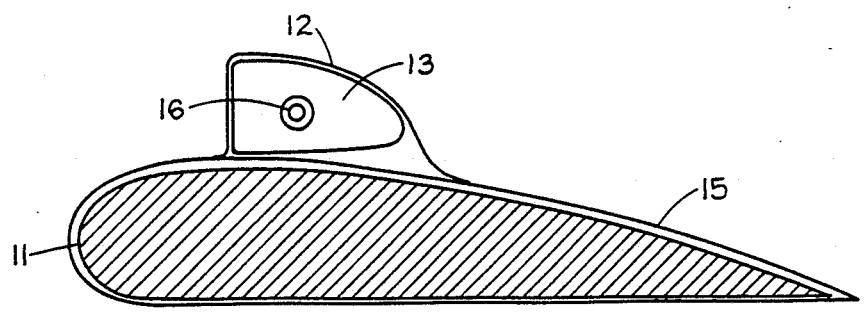
FIG. 4 cross sectional view.

For the purpose of promoting an undestanding of the principles of the invention, reference will now be made to the embodiment illustrated in the drawings and specific language will be used to describe the same. Shown in the figures is an airfoil of cambered design, that of being a typical helicopter rotor blade 11, which illustrates a typical application of the invention, but is not limited to such application, and as such is applicable to any airfoil on any type of aircraft. FIG. 1 illustrates the typical rotorblade 11, rotorblade grip 10, and rotorblade retaining bolt 18. When parked, the rotorblade 11 is secured by means of a rotorblade tiedown 14 which is attached to the rotorblade 11 which is fastened either to a hard point on the aircraft or the ground.

In accordance with the present invention, a portable environmental protection cover 15 is mounted on each rotorblade. The number of environmental protection covers mounted will correspond to the number of rotorblades per aircraft. Each environmental protection cover 15 is identical and, therefore, only one will be described in detail.

The environmental protection cover 15 is composed of an elongated envelope made of strong, light-weight sheet fabric material conforming to the shape of the rotorblade 11. The cover 15 is left open at the blade grip 10 end to allow the cover 15 to be slipped over the end of the rotorblade 11, thus providing complete protection for the entire length of the rotorblade 11. The cover 15 is secured to the rotorblade 11 by means of securing devices 17 on the blade grip end of cover 15. Attached to the top of the cover 15 is the aircell chamber 12 made of the same material as the cover 15 and is only slightly shorter in length than the cover 15. The aircell chamber 12 provides a housing and protection for the aircell 13 which is made of an inflatable air retaining material designed to retain its designed shape for spoiling once inflated and conforms to the length of the aircell chamber 12. The aircell 13 is inflated through an airvalve 16. The employment of the removable lift spoiler will now be described. The cover 15 with the aircell 13 in place within the aircell chamber 12 is introduced over the end of the rotorblade 11 and slid toward the bladegrip 10. After the cover 15 is in place the securing straps are tightened and secured with fasteners. A device supplying air under pressure is attached to the airvalve 16 by means of a flexible pneumatic hose and the aircell 13 is inflated, providing the desired airfoil spoiler shape. The effect of placing the aircell 13 on the top of the rotorblade is to move the air boundary layer separation point to the front of the airfoil, thus putting the airfoil into a full stall and producing little or no lift. The invention helps prevent storm or wind damage by reducing the amount of lift produced by high wind across the airfoil, thus reducing excessive blade or wing movement. The aircell 13 is easily and quickly deflated and the removalbe lift spoiler cover 15 is then easily removed for storage by sliding it off the rotorblade 11 from the tie down end 14. Normal storage would be by simply rolling or folding the environmental protection cover 15 with the collapsed aircell 13 deflated and held in place by the aircell chamber 12. At this point it can be stored and transported easily.

The present invention provides an important advantage over other design methods of protecting parked aircraft from wind damage insofar as it is simplistic, yet effective design with no moving parts, its adequately designed to fit the airfoils in use now that require a faster and more protective spoiler system which can be placed on an aircraft in a very short period of time, is cost effective, and is actively protecting the aircraft all of the time once installed. It does not rely on the wind to activate it, nor does this invention require multiple spoilers as some previously earlier designed systems would require, thus reducing the aircraft owners expense. To those skilled in the art, it is apparent that this invention has many variations within the scope of the appended claims once the principles described above ar understood.

What is claimed

1. A device for spoiling the lift generating capacity of parked aircraft airfoils, comprising a removable airfoil projection cover, an aircell chamber, both being constructed of sheet material, and an inflatable airfoil spoiler that is rouund in shape to afford smooth effective spoiling when overpresurrized and maintain its designed shape in high wind wherein said chamber is of a strong light-weight fabric sheet material that is permanently attached longitudinally to the top of said cover to house and protect the inflatable airfoil spoiler aircell.

2. The removable airfoil enviromental protection cover of claim 1 wherein said cover is of a strong lightweight fabric that covers the entire lift generating portion of the airfoil, and is attached to the protected airfoil by means of a securing device.

3. The inflatable airfoil spoiler aircell of claim 1 wherein said aircell is of air retaining material which will retain its designed spoiler shape when inflated and is inflated and deflated by an airvalve attached to said aircell.

* * * * *